(12) United States Patent
Hiramatsu

(10) Patent No.: US 9,588,649 B2
(45) Date of Patent: Mar. 7, 2017

(54) DATA PROCESSING DEVICE AND PROGRAM THEREOF

(71) Applicant: Panasonic Intellectual Property Management Co., Ltd., Osaka (JP)

(72) Inventor: Yoshinori Hiramatsu, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1 day.

(21) Appl. No.: 14/429,144

(22) PCT Filed: Sep. 20, 2013

(86) PCT No.: PCT/JP2013/005561
§ 371 (c)(1),
(2) Date: Mar. 18, 2015

(87) PCT Pub. No.: WO2014/045591
PCT Pub. Date: Mar. 27, 2014

(65) Prior Publication Data
US 2015/0227266 A1    Aug. 13, 2015

(30) Foreign Application Priority Data

Sep. 21, 2012 (JP) ................................ 2012-207871

(51) Int. Cl.
| H04N 5/76 | (2006.01) |
| G06F 3/0482 | (2013.01) |
| G06F 3/0488 | (2013.01) |
| G11B 27/34 | (2006.01) |
| H04N 5/85 | (2006.01) |

(52) U.S. Cl.
CPC .......... *G06F 3/0482* (2013.01); *G06F 3/0488* (2013.01); *G11B 27/34* (2013.01); *H04N 5/7605* (2013.01); *H04N 5/85* (2013.01)

(58) Field of Classification Search
CPC ..... G06F 3/0482; G06F 3/0488; G11B 27/34; G11B 27/105; H04N 5/85; H04N 5/45434
See application file for complete search history.

(56) References Cited

U.S. PATENT DOCUMENTS

2005/0177791 A1* 8/2005 Jung .................... H04N 5/9201
                                                           715/716
2012/0084650 A1    4/2012 Uchimura

FOREIGN PATENT DOCUMENTS

| JP | 2004-47081 | 2/2004 |
| JP | 2005-136490 | 5/2005 |
| JP | 2007-60040 | 3/2007 |

(Continued)

OTHER PUBLICATIONS

International Search Report issued Oct. 22, 2013 in International (PCT) Application No. PCT/JP2013/005561.

*Primary Examiner* — Huy T Nguyen
(74) *Attorney, Agent, or Firm* — Wenderoth, Lind & Ponack, L.L.P.

(57) ABSTRACT

A signal processing unit (11) displays a menu included in AV data on a display (4), when a button included in the menu is selected through a user operation to a touch panel (5), the signal processing unit (11) executes the operation process of the button, and returns a state of the menu to a state before the button is selected if a state where the button is selected continues after the execution. By this means, it is possible to improve usability when a dummy button is selected through operation to the touch panel.

7 Claims, 6 Drawing Sheets

(56) References Cited

FOREIGN PATENT DOCUMENTS

| | | |
|---|---|---|
| JP | 2008-54074 | 3/2008 |
| JP | 2012-79090 | 4/2012 |

\* cited by examiner

MENU EXAMPLE (a)

(b)

(c)

(d)

DATA PROCESSING DEVICE AND PROGRAM THEREOF

TECHNICAL FIELD

The present invention relates to a data processing device which processes AV data held in a recording medium such as a BD-ROM (Blu-ray(registered trademark)-Disc-Read-Only-Memory).

BACKGROUND ART

This type of data processing device includes a data communication unit that acquires AV data, a signal processing unit that performs signal processing on the AV data input from the data communication unit, a display that displays video output from the signal processing unit and a touch panel which is integrated with the display and which receives a user operation.

The signal processing unit displays a menu included in the AV data on the display, and, when a user selects a button included in the menu, highlights the button (see, for example, Patent Literature 1 described below).

In the BD-ROM, or the like, the menu sometimes includes a button (dummy button) through which no processing is performed or a hidden button which is not displayed on a screen. These buttons are created assuming that operation is performed by a remote control.

Therefore, while these buttons cannot be selected with the remote control, the user can directly select these buttons on the display provided with the touch panel by touching the buttons on the screen.

However, in the conventional example, there is a problem that when the user selects this dummy button through the touch panel, because a state where this dummy button is selected (the dummy button is highlighted) continues, the user cannot understand what kind of state the menu is put into.

Specifically, in the conventional example, if the button is selected, the button is highlighted. In this case, for example, when the user selects a dummy button which has only a frame and which does not have any indication of a function through the touch panel, the highlighting moves to this dummy button. Therefore, in the menu screen, because a portion with no button is highlighted, the user cannot understand the state of the menu and gets confused.

CITATION LIST

Patent Literature

Patent Literature 1: Japanese Patent Laid-Open No. 2012-79090

SUMMARY OF INVENTION

Technical Problem

The present invention has been made in view of the above-described circumstances. An object of the present invention is to improve usability of a menu screen.

Solution to Problem

A data processing device according to a first aspect of the present disclosure includes a data communication unit that acquires AV data, a signal processing unit that performs signal processing on the AV data input from the data communication unit, a display that displays video output from the signal processing unit, and a touch panel that receives a user operation, the touch panel being integrated with the display, and the signal processing unit displays a menu included in the AV data on the display, and, when a button included in the menu is selected through a user operation to the touch panel, the signal processing unit executes operation processing of the button, and, when a state where the button is selected continues after the execution, the signal processing unit returns a state of the menu to a state before the button is selected.

As described above, because the data processing device according to the first aspect of the present disclosure includes a data communication unit that acquires AV data, a signal processing unit that performs signal processing on the AV data input from the data communication unit, a display that displays video output from the signal processing unit and a touch panel that receives a user operation, the touch panel being integrated with the display, and is configured so that the signal processing unit displays a menu included in the AV data on the display, and, when a button included in the menu is selected through a user operation to the touch panel, the signal processing unit executes operation processing of the button, and when a state where the button is selected continues after the execution, the signal processing unit returns a state of the menu to a state before the button is selected, it is possible to improve usability.

That is, if a button directly operated by the user through the touch panel is a dummy button, no processing is performed, and the menu is put into a state where the dummy button is selected. However, after that, because the state of the menu returns to a state before the dummy button is selected, the device operates as if the dummy button could not be selected. Therefore, even if the user directly operates a dummy button, because the state of the menu does not change, the user does not misunderstand. As a result, the usability is improved.

As will be described below, there are other aspects of the present invention. Therefore, this disclosure of the present invention is intended to provide part of aspects of the present invention, and is not intended to limit the scope of the invention described and claimed herein.

DESCRIPTION OF EMBODIMENTS

An embodiment of the present invention will be described below using the accompanying drawings.

(Embodiment 1)

Figure 1:
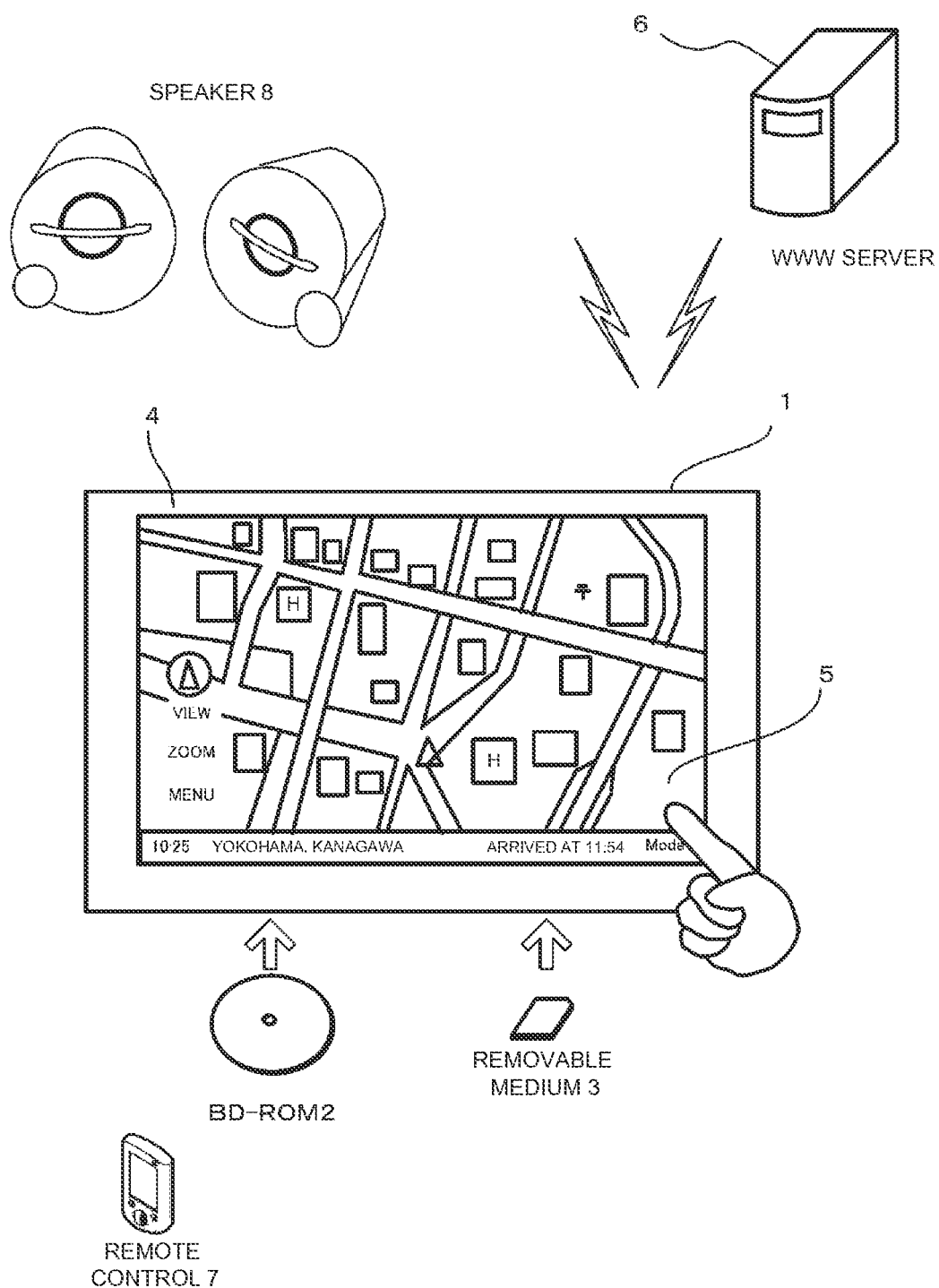
FIG. 1 is a configuration diagram of a data processing device according to an embodiment of the present invention.

FIG. 1 illustrates an example of usage patterns of a data processing device 1 as a system.

The data processing device 1 can hold a BD-ROM 2 and a removable medium 3 and acquires various data. Further, the data processing device 1 includes a display 4, and a touch panel 5 is attached on a screen of the display 4.

Further, the data processing device 1 can communicate with a WWW server 6 which is connected via a network, and may be configured to allow operation through a remote control 7 and to play music from a speaker 8.

Figure 2:
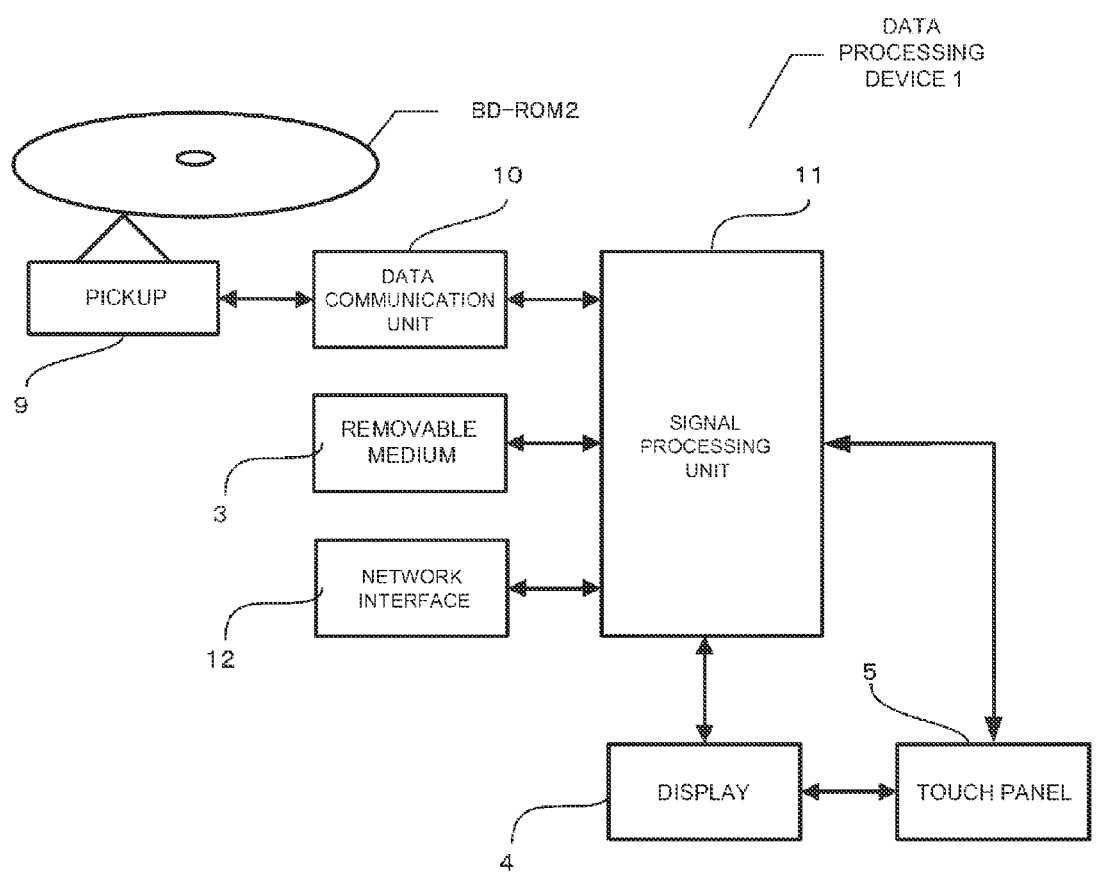
FIG. 2 is a block diagram of the data processing device.

FIG. 2 is a block diagram of the data processing device 1.

In the present embodiment, data processing is performed on AV data acquired from the BD-ROM 2 through a pickup 9. Of course, AV data may be acquired from the removable medium 3 or acquired from the WWW server 6 through a network interface 12.

The data processing device 1 includes a data communication unit 10 that acquires AV data recorded in the BD-ROM 2 and a signal processing unit 11 that performs signal processing on the AV data input from the data communication unit 10.

The display 4 which displays video output from the signal processing unit 11 includes the touch panel 5 which is integrated with the display 4 and which receives a user operation.

The signal processing unit 11 performs data processing on the AV data input from the data communication unit 10 and displays a menu included in the AV data on the display 4.

Figure 3:
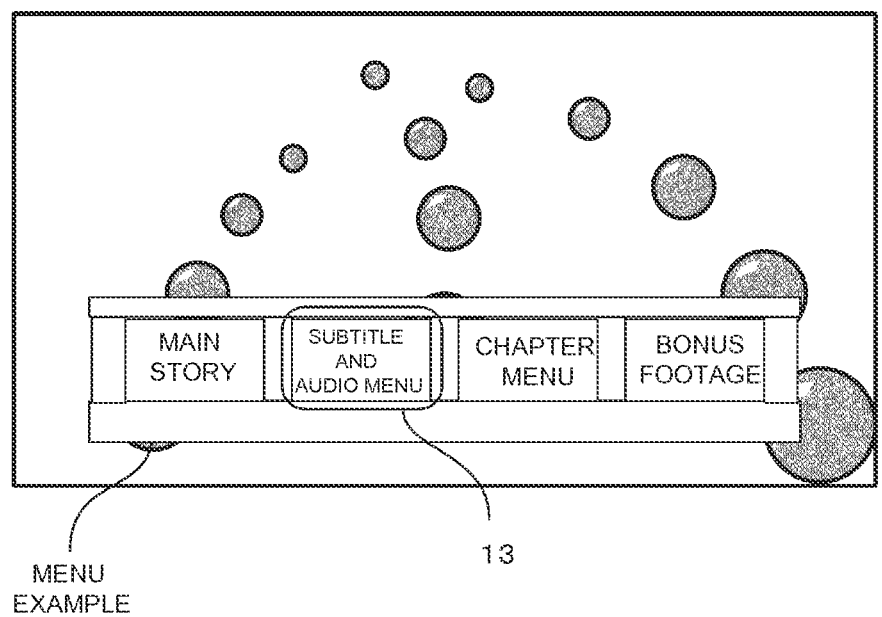
FIG. 3 is a diagram for explaining a menu screen of the data processing device.
Figure 3:
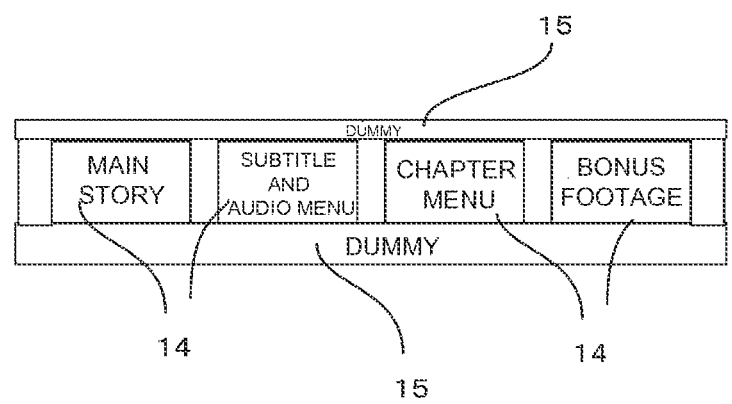

An example of the menu is illustrated in FIG. 3. The menu is implemented by superimposing graphics on the video. The signal processing unit 11 creates graphics by performing data processing on the AV data and performs processing of superimposing the graphics on the video.

At this time, when a button included in the menu is selected, the signal processing unit 11 generates graphics in which the button is highlighted 13. Highlighting 13 is performed by, for example, surrounding the button with a frame or expressing characters displayed on the button in red color. It is only necessary to display the selected button so as to be able to be visually distinguished from buttons other than the selected button.

Description returns to explanation of FIG. 3.

Buttons with "main story", "subtitle and audio menu", "chapter menu" and "bonus footage" are normal buttons 14. When the user selects one of these normal buttons 14 by directly operating the touch panel 5, a function of the selected button is executed.

Here, in the BD-ROM 2, or the like, there is a title having blank portions between the normal buttons 14 and dummy buttons 15 above and below the normal buttons 14.

The dummy buttons 15 which are provided for configuring the menu, are set so as not to be able to be selected by depression of an upper portion, a lower portion, a right portion or a left portion of a cross key of the remote control 7. However, the user can select these dummy buttons 15 by directly operating the touch panel.

In this way, while the dummy buttons 15 can be selected, because the dummy buttons 15 are buttons not linked to any function, no operation such as change of menu occurs.

Figure 4:
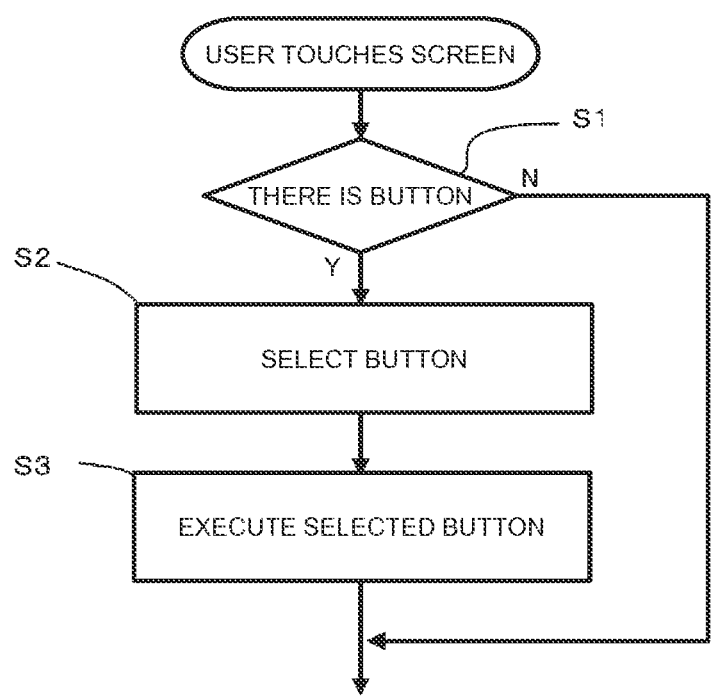
FIG. 4 is a flowchart of operation of the data processing device.

Processing in a case where a normal button 14 is operated through the touch panel 5 will be described next using FIG. 4.

When acquiring information that the user touches the screen from the touch panel 5, the signal processing unit 11 confirms whether or not there is a button at a portion where the user touches (step 1).

When there is a button, the signal processing unit 11 selects the button and highlights the button 13 (step 2). Then, the signal processing unit 11 executes operation processing of the selected button (step 3).

By this means, a navigation command defined for the button operates, and operation such as switching of a playback position and switching of a stream is performed. It should be noted that a title is comprised of a plurality of streams, and order of playing back each stream is defined, so that various video and sound can be played back.

Figure 5:
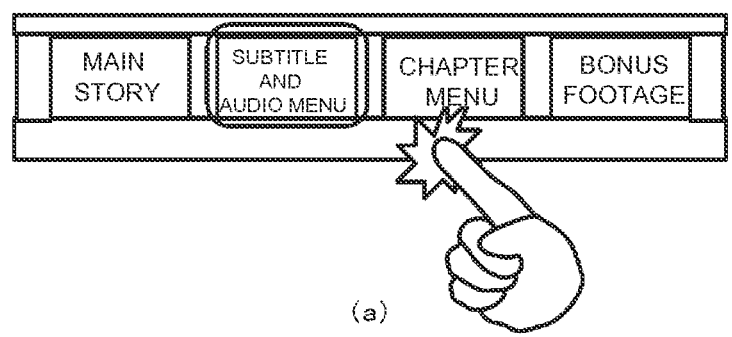
FIG. 5 is a diagram for explaining a menu screen of the data processing device.
Figure 5:
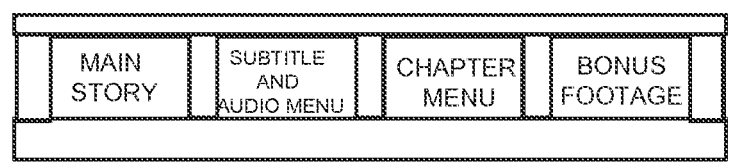
Figure 5:
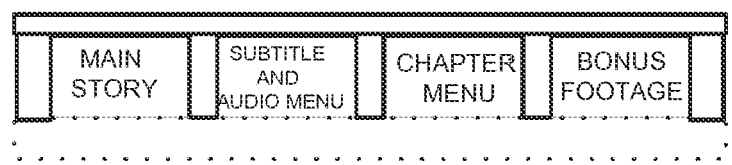
Figure 5:
Figure 6:
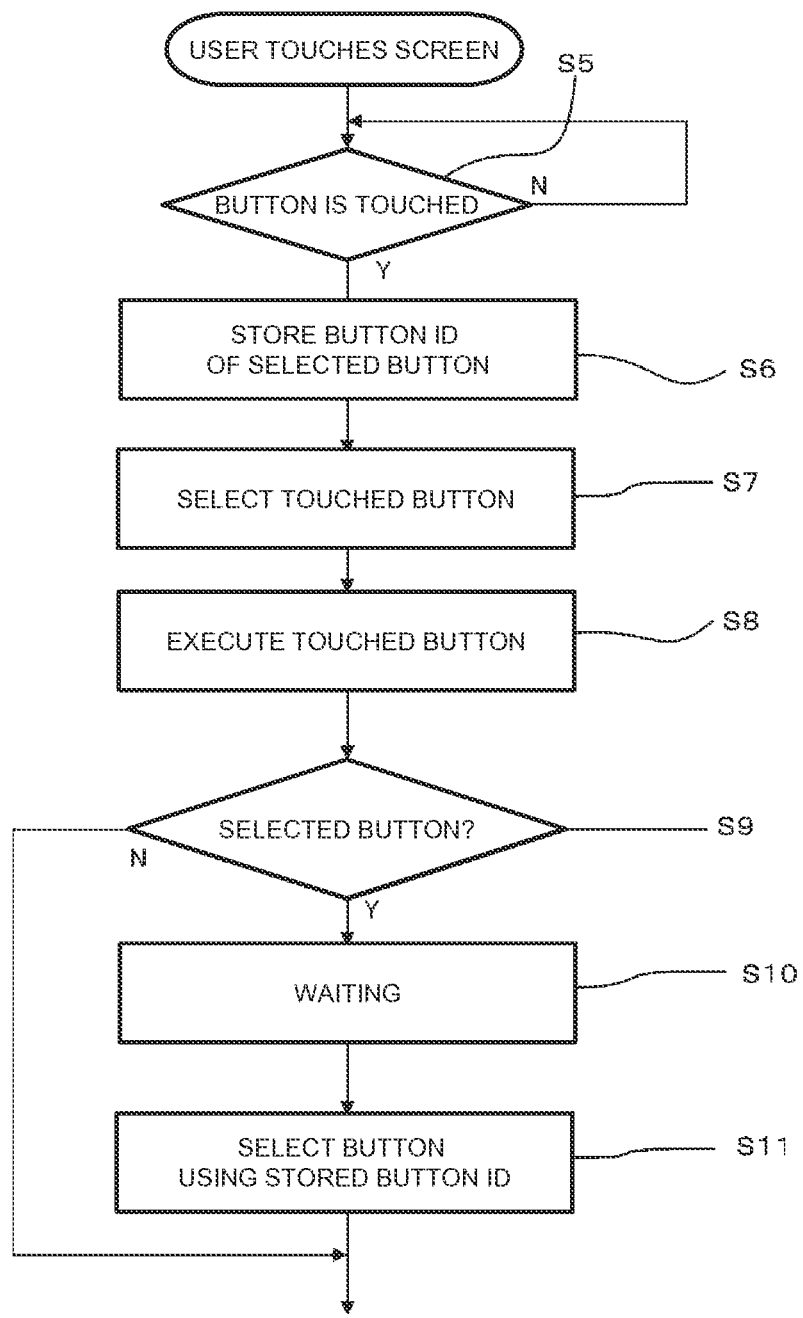
FIG. 6 is a flowchart of operation of the data processing device.

Processing in a case where the user operates a dummy button 15 through the touch panel 5 will be described next using FIG. 5 and FIG. 6. FIG. 5 illustrates what kind of state the menu is put into, and FIG. 6 illustrates the processing flow.

First, as illustrated in FIG. 5(*a*), when the signal processing unit 11 detects that the user touches a dummy button 15 through the touch panel 5 (step S5: Yes), the signal processing unit 11 holds a button ID of a button which has been selected before the touch in a memory (not illustrated) (step S6). It should be noted that a unique button ID is assigned to each button for each menu.

At this time, the signal processing unit 11 does not distinguish a case where the operated button is a dummy button from a case where the operated button is a normal button 14. Therefore, the signal processing unit 11 performs processing of holding the button ID of the button which has been selected before the touch in the memory (not illustrated) (step S6) also in a case where the normal button 14 is operated.

Next, the signal processing unit 11 selects the button touched by the user through the operation of the touch panel (step S7) and executes the operation processing of the selected button (step S8).

In the next step S9, the signal processing unit 11 judges whether the button ID held in step S6 is identical with a button ID of the button which is selected after the execution of step S8. If the button ID held in step S6 is identical with the button ID of the button which is selected after the execution of step S8, the signal processing unit 11 maintains a state where the button is selected (step S10) for a while, and returns to a state where the button of the button ID held in step S6 is selected (FIG. 5(*d*)).

The reason why the state is returned to a state where the button of the button ID held in step S6 is selected is because the button touched in step S5 is a dummy button 15. At this time, as illustrated in FIG. 5, the highlighting disappears (FIG. 5(*d*)), or the button itself disappears (FIG. 5(*c*)).

It is also possible to stop highlighting of the button for only a moment and return to a state where the button which has been selected before the touch is highlighted, instead of switching the button to be highlighted within an instantaneous period without making the user aware of the period of step S10. By this means, the user can understand that the user has selected a button which cannot be operated.

Further, in step S9, even if the button ID held in step S6 is identical with the button ID of the button which is selected after the execution of step S8, the signal processing unit 11 maintains a state where the button is selected in the following cases.

Specifically, the cases include a case where the button selected after the execution causes animation to be played back repeatedly or causes operation sound to be played back, a case where the total number of selectable buttons changes, a case where a page of the menu changes, and a case where a stream ID changes.

The animation of the button is a function that a plurality of images from a starting image to an end image are displayed at regular intervals. When the animation is repeatedly displayed, because it can be understood that a person who creates the content wants the user to see the animation of the button until the position of the button is changed, it is preferable to maintain a state where the button is selected. It is also preferable to maintain a state where the button is selected for the same reason in a case where the operation sound is played back.

The case where the total number of selectable buttons changes corresponds to processing of switching a state of the button between an enabled state and a disabled state using the navigation command. In this case, because even if the selected button does not change, the number of buttons changes through the navigation command, and it is judged that the navigation command has had an effect.

The case where the page of the menu changes is a case where the menu itself changes. While button IDs are unique in each menu, there is a case where there is the same button ID when the menu changes. It is because the user will get confused, if the processing of step S11 is performed in that case.

The case where the stream ID changes corresponds to a case where a button for selecting audio and subtitle is operated. For example, there is a button which changes audio language from Japanese to English when being depressed and changes audio language from English to Japanese when being depressed again. In this case, while the stream ID of a stream to be played back changes every time the button is depressed, the button ID does not change. In this case, while the button ID does not change, because the button is not a dummy button which is not linked to any function, the processing of step S11 is not performed.

While the operation flow of FIG. 6 has been described as a program mounted on the data processing device 1, it is also possible to mount this program on any of the BD-ROM 2, the removable medium 3 and the WWW server 6.

As described above, the data processing device 1 of the present embodiment includes the data communication unit 10 that acquires AV data, the signal processing unit 11 that performs signal processing on the AV data input from the data communication unit 10, the display 4 that displays video output from the signal processing unit 11, and the touch panel 5 which is integrated with the display 4 and which receives a user operation, the signal processing unit 11 displays a menu included in the AV data on the display 4, and, when a button included in the menu is selected through a user operation to the touch panel 5, the signal processing unit 11 executes operation processing of the button, and, when a state where the button is selected continues after the execution, the signal processing unit 11 returns a state of the menu to a state before the button is selected, so that it is possible to improve usability.

That is, when a button directly operated by the user through the touch panel 5 is a dummy button, no processing is performed, and the state of the menu is put into a state where the dummy button is selected. However, because the state of the menu subsequently returns to a state before the dummy button is selected, the device operates as if the dummy button cannot be selected. Therefore, even if the user directly operates a dummy button, because the state of the menu does not change, the user does not misunderstand. As a result, it is possible to improve usability.

While a preferred embodiment of the present invention which can be considered at the present moment has been described above, it will be understood that various modifications are possible in the present embodiments, and the attached claims are intended to incorporate all such modifications which fall within the spirit and the scope of the present invention.

INDUSTRIAL APPLICABILITY

As described above, a data processing device of the present invention includes a data communication unit that acquires AV data, a signal processing unit that performs signal processing on the AV data input from the data communication unit, a display that displays video output from the signal processing unit, and a touch panel which is integrated with the display and which receives a user operation, the signal processing unit displays a menu included in the AV data on the display, and, when a button included in the menu is selected through a user operation to the touch panel, the signal processing unit executes operation processing of the button, and, when a state where the button is selected continues after the execution, the signal processing unit returns a state of the menu to a state before the button is selected, so that it is possible to improve usability.

Therefore, the data processing device of the present invention is expected to be utilized as a data processing device which performs data processing on AV data.

REFERENCE SIGNS LIST

1 Data processing device
2 BD-ROM
3 Removable medium
4 Display
5 Touch panel
6 WWW server
7 Remote control
8 Speaker
9 Pickup
10 Data communication unit
11 Signal processing unit
12 Network interface
13 Highlighting
14 Normal button
15 Dummy button

The invention claimed is:

1. A data processing device comprising:
a data communication unit that acquires AV data;
a signal processing unit that performs signal processing on the AV data input from the data communication unit;
a display that displays video output from the signal processing unit; and
a touch panel that receives a user operation, the touch panel being integrated with the display,
wherein the signal processing unit displays a menu included in the AV data on the display, and
when a button included in the menu is selected through a user operation to the touch panel, the signal processing unit executes operation processing of the button, and, when a state where the button is selected continues after the execution, the signal processing unit returns the state of the menu to a state before the button is selected.

2. The data processing device according to claim 1, wherein, when a button included in the menu is selected, the signal processing unit highlights the button.

3. The data processing device according to claim 1, wherein the signal processing unit judges whether a selected button is identical before operation processing of the button and after the operation processing of the button through a button ID assigned for each menu.

4. The data processing device according to claim 3, wherein, when a menu before operation processing of the button is different from a menu after the operation processing of the button, the signal processing unit judges that the button which is selected after the operation processing of the button is different from the button before the operation processing of the button even if the button ID is identical.

5. The data processing device according to claim 2, wherein after the operation processing of the button included in the menu is executed, when a state where the button is selected continues, the signal processing unit maintains a state where the button is highlighted for a predetermined time period.

6. The data processing device according to claim 1, wherein the button is a dummy button which does not cause the signal processing unit to execute operation processing even if the button is selected through the user operation.

7. The data processing device according to claim 1, wherein, when the button causes animation to be played back repeatedly, when the button causes operation sound to be played back, or when a stream ID is different before and after operation, the signal processing unit maintains a state where the button is selected.

\* \* \* \* \*